United States Patent
Jarvis et al.

(10) Patent No.: US 6,469,776 B2
(45) Date of Patent: *Oct. 22, 2002

(54) DYE TRANSFER APPARATUS AND METHOD FOR PROCESSING COLOR MOTION PICTURE FILM

(75) Inventors: Ronald W. Jarvis, Westlake Village; Richard J. Goldberg, Tarzana; Frank J. Ricotta, Westlake Village, all of CA (US); Ronald W. Corke, Buckinghamshire (GB); Lawrence A. Curtis, Whittier, CA (US); Steven Garlick, Chino Hills, CA (US); David M. Gilmartin, Chino Hills, CA (US)

(73) Assignee: Technicolor, Inc., North Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/882,556

(22) Filed: Jun. 15, 2001

(65) Prior Publication Data

US 2002/0018196 A1 Feb. 14, 2002

Related U.S. Application Data

(62) Division of application No. 09/624,359, filed on Jul. 24, 2000, now Pat. No. 6,327,027, which is a continuation of application No. 09/416,923, filed on Oct. 13, 1999, now Pat. No. 6,094,257, which is a division of application No. 08/925,867, filed on Sep. 9, 1997, now Pat. No. 6,002,470.

(51) Int. Cl.[7] .................. G03B 27/32; G03B 27/04; G03B 19/18

(52) U.S. Cl. .............. 355/77; 355/27; 355/97; 352/38

(58) Field of Search .............. 355/97, 27–29, 355/40–43, 32, 77, 79, 405–407; 352/38, 44; 101/149.1; 396/31, 524, 526–527, 580, 647, 575; 430/199, 200

(56) References Cited

U.S. PATENT DOCUMENTS

| 1,579,805 | A | 4/1926 | Ball et al. ............... 352/38 |
| 1,579,806 | A | 4/1926 | Ball et al. ............... 352/44 |
| 2,044,810 | A | 6/1936 | Rackett ................... 33/17 |
| 2,244,133 | A | 6/1941 | Taylor .................. 101/130 |
| 2,328,492 | A | 8/1943 | Rackett ................... 74/259 |
| 2,369,176 | A | 2/1945 | Rackett ............... 271/149.1 |
| 2,437,361 | A | 3/1948 | Rackett ................ 271/2.3 |
| 2,448,691 | A | 9/1948 | Taylor ................. 271/2.3 |
| 2,457,319 | A | 12/1948 | Rackett ................ 271/3.1 |
| 2,484,871 | A | 10/1949 | Andreas ............... 271/2.6 |

(List continued on next page.)

FOREIGN PATENT DOCUMENTS

| EP | 0 452 566 A1 | 10/1991 |
| EP | 0 555 834 A2 | 8/1993 |
| GB | 300818 | 12/1928 |
| WO | WO 95/15638 | 6/1995 |

*Primary Examiner*—Alan A. Mathews
*Assistant Examiner*—Hung Henry Nguyen
(74) *Attorney, Agent, or Firm*—Lyon & Lyon LLP

(57) ABSTRACT

A method is provided for transferring dye from a dye imbibed matrix film to a receiver film for producing a dye transfer print of a motion picture print. A dye imbibed matrix film and a receiver film are superimposed together in precise registration on a seating apparatus, e.g., a pin belt, to create a two-film sandwich. The two-film sandwich is stripped from the seating apparatus before completing dye transfer, and dye transfer from the matrix film to the receiver film is completed along a pinless, substantially rectilinear film path while maintaining the two-film sandwich in precise registration. For example, a transfer cabinet may be provided that includes a plurality of rollers having a predetermined relationship to one another and defining the substantially rectilinear film path, and the two-film sandwich may be directed along the film path to complete dye transfer.

14 Claims, 10 Drawing Sheets

U.S. PATENT DOCUMENTS

| | | |
|---|---|---|
| 2,561,497 A | 7/1951 | Clark et al. .................. 271/2.1 |
| 2,572,001 A * | 10/1951 | Bennes ........................ 154/98 |
| 2,648,280 A | 8/1953 | Pohl ........................ 101/149.1 |
| 2,719,805 A | 10/1955 | Bennes ........................ 154/98 |
| 2,767,649 A | 10/1956 | Lofquist, Jr. ............. 101/149.1 |
| 3,750,567 A | 8/1973 | Taguchi et la. ............. 101/181 |
| 3,772,991 A | 11/1973 | Taguchi et al. .......... 101/415.1 |
| 4,914,463 A * | 4/1990 | Yui ............................. 354/304 |
| 4,977,422 A | 12/1990 | Vaughan, IV ............... 354/317 |
| 5,025,281 A * | 6/1991 | Nakata ........................ 355/27 |
| 5,752,122 A * | 5/1998 | Ishikawa .................... 396/612 |

* cited by examiner

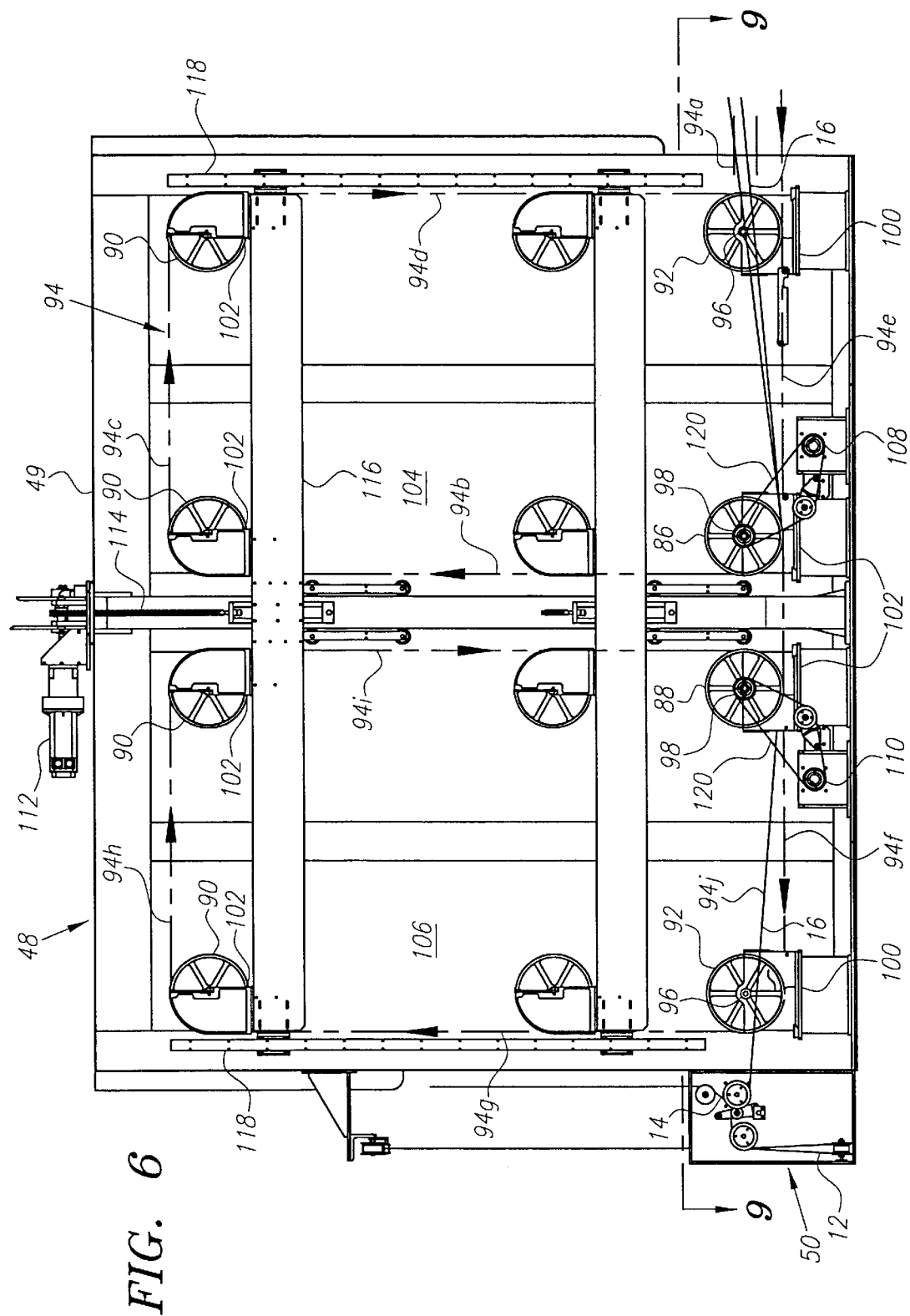

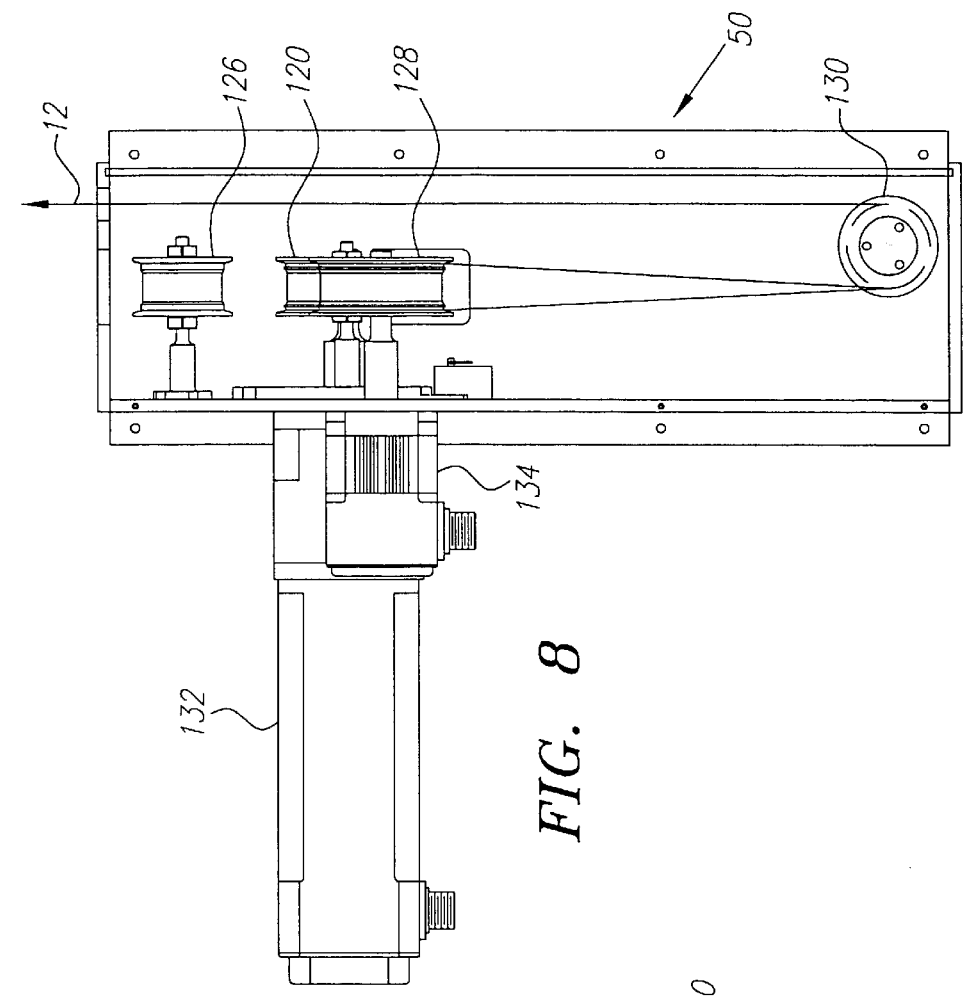
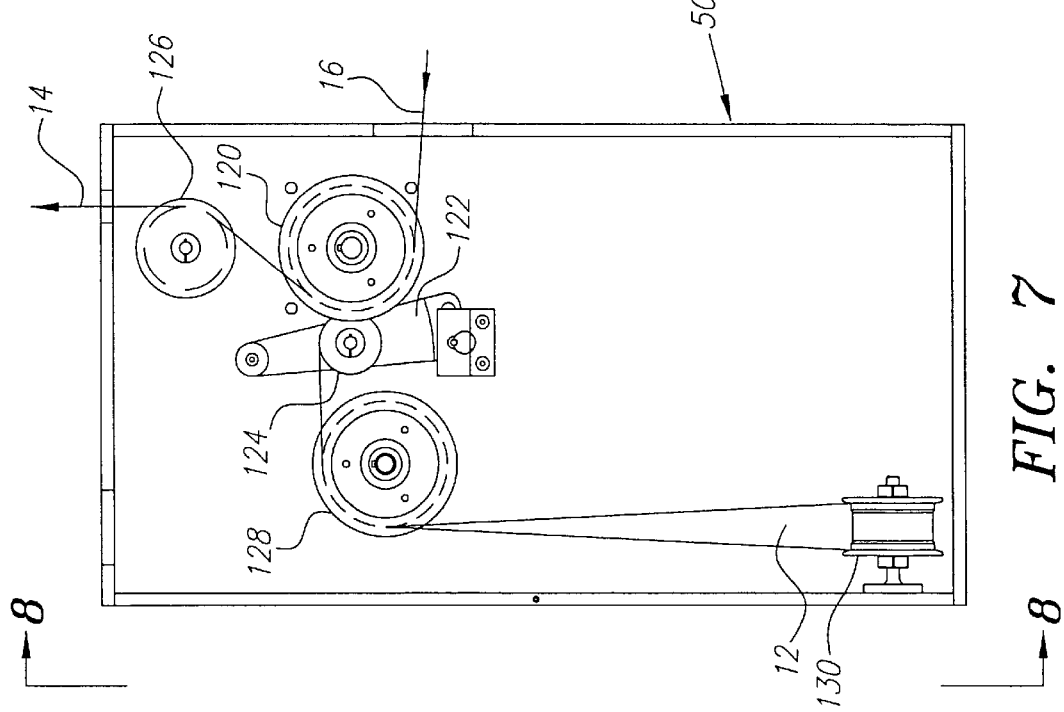

DYE TRANSFER APPARATUS AND METHOD FOR PROCESSING COLOR MOTION PICTURE FILM

This is a divisional of application Ser. No. 09/624,359, filed Jul. 24, 2000, now U.S. Pat. No. 6,327,027, which is a continuation of application Ser. No. 09/416,923 filed on Oct. 13, 1999, now U.S. Pat. No. 6,094,257, which is a divisional of application Ser. No. 08/925,867, filed on Sep. 9, 1997, now U.S. Pat. No. 6,002,470.

FIELD OF THE INVENTION

The present invention relates generally to film processing, and more particularly to an improved system and method for producing printed copies of motion picture films by dye transfer.

BACKGROUND

In the field of professional cinematography, it is necessary under many circumstances that two lengths of film be kept in close and accurate register with one another throughout a lengthy continuous path. For example, in manufacturing a dye transfer print of a motion picture from three dye imbibed photographic matrices, it is essential that the dye image from each individual matrix be transferred to a receiver film in near perfect register with each other in three consecutive steps on a continuous machine. Further, it is also essential that each individual record is transferred completely from matrix to receiver film with substantially no movement of one film relative to the other, until such time as all of the image has been transferred from each individual matrix to the common receiver.

Previously, matrix and receiver films were placed in intimate contact with each other via a multi-stage seating mechanism generally known as a roll tank. While being placed into intimate contact with each other, the two films were also seated onto a stainless steel ribbon, known as a pin belt. The pin belt typically traveled in an orbital path extending around and between two or more drums or wheels. The perforations or sprocket holes of the sandwiched films were placed over silver alloy pins raised above the flat stainless steel ribbon. Both films remained firmly seated on the pin belt for the duration of time needed for complete dye transfer from matrix to receiver, generally about thirty five seconds.

Because of the time required for complete dye transfer, such pin belts generally had a peripheral length of about 205 feet and were operated at speeds of about 330 feet per minute. One of the difficulties resulting from using such long belts is achieving and maintaining the exacting pin tolerances necessary to hold the precise registration needed to produce high quality prints. In addition, repair and replacement of these long belts was indeed expensive and difficult. The machinery and methods used for dye transfer of color film prints has remained substantially unchanged since its original development in the 1920's and 1930's.

To obtain the faster throughput necessary to meet the demand for the larger quantities of prints required today, the operating speed of a dye transfer machine must be increased. A larger apparatus requiring a longer pin belt, however, would only magnify the problems of maintaining the exacting pin tolerances necessary to maintain precise registration during dye transfer. The space required for such an apparatus and the cost to manufacture and maintain the pin belt generally render such a system commercially impracticable.

For these and other reasons, the dye transfer process generally has become less favored than photographic copying processes. Conventional photographic copying of a master onto unexposed photographic films, such as nitrate, acetate, and more recently polyester films, are now widely used for producing the large number of prints needed for modern theater distribution, which can require more than 4,000 prints per film.

Photographic film processing, however, does not provide the precise color control of tone scale and color reproduction available using dye transfer processing, which may result in inferior color rendition in photographic film prints. Further, photographic film has a greater tendency to fade over time, resulting in a less durable print.

Accordingly, there is a need for an improved system for producing dye transfer prints of motion pictures that is capable of maintaining precise registration at high volume production speeds.

There is also, then, a need for a method of producing dye transfer prints of films competitively in sufficient quantities for the continuously growing need of motion picture theater distribution.

SUMMARY OF THE INVENTION

The present invention is directed to a system for producing printed copies of films by dye transfer. More particularly, the present invention is directed to an apparatus and method for maintaining sandwiched films, comprising a matrix film superimposed onto a receiver film, in precise registration during dye transfer, the predominance of which is accomplished without a pin belt.

Generally, a dye transfer apparatus in accordance with the present invention includes a roll tank having a first plurality of rollers in a predetermined orientation. The first plurality of rollers is adapted to superimpose a blank or receiver film onto a dye-imbibed matrix film in a predetermined registration, i.e. to place the receiver and matrix films in intimate contact, thereby creating a two-film "sandwich" for dye transfer.

The roll tank communicates with a pin belt, which includes a plurality of pins or teeth on a ribbon traveling in an orbital path. The pins engage sprocket holes in the two-film sandwich delivered within the roll tank, thereby directing the two-film sandwich along a portion of the orbital path. The pins also have a predetermined spacing therebetween for maintaining the two-film sandwich in precise registration as they travel along the orbital path. A first stripping roller is provided in communication with the pin belt, which strips the two-film sandwich from the pin belt, while maintaining the films in precise registration and without adversely affecting the adhesion between the films.

A transfer cabinet then receives the two-film sandwich from the first stripping roller to substantially complete dye transfer. The transfer cabinet includes a second plurality of rollers having a predetermined relationship to one another, and an elevator mechanism for adjusting the predetermined relationship. The rollers in the transfer cabinet have relatively large diameters compared to the other rollers in the apparatus, thereby defining substantially rectilinear paths along their perimeters. The rollers define a film path along which the two-film sandwich travels through the transfer cabinet, the two-film sandwich traveling systematically around a portion of the perimeters of the rollers and between the rollers in a predetermined sequence. The rollers also preferably have substantially uniform, toothless perimeters, thereby allowing the two-film sandwich to travel along the perimeters thereof without requiring sprockets or teeth to engage the two-film sandwich, while maintaining the films in precise registration and without adversely affecting the adhesion between the films.

The elevator mechanism includes one or more servo-motors for precisely adjusting the position of one or more corresponding rollers within the transfer cabinet, thereby providing a predetermined tension on the two-film sandwich traveling along the film path. The elevator mechanism may be adjusted manually, or may include one or more sensors for measuring the actual tension of the two-film sandwich as it travels along the film path. Preferably, the transfer cabinet also includes a pair of synchronized servo-motors for adjusting the distribution of tension of the two film sandwich, thereby providing additional tension adjustment, and thereby further maintaining the two-film sandwich in precise registration and without adversely affecting the adhesion between the films.

The transfer cabinet also provides predetermined atmospheric conditions, such as a predetermined temperature and humidity, to promote complete dye transfer from the dye imbibed matrix to the receiver film as the two-film sandwich travels through the cabinet in a predetermined time.

A second stripping roller, including a third plurality of rollers in a predetermined orientation, is provided in communication with the film path of the transfer cabinet. The third plurality of rollers separate the matrix film from the receiver film after complete dye transfer has occurred substantially within the transfer cabinet.

The separated receiver film may then be processed using other apparatus and methods to provide a finished print. For example, the receiver film may be directed through a subsequent system similar to that just described to transfer an additional color to the receiver film. The matrix film may be directed through dying equipment, or a spray dye tank, and followed by a washback system enclosure, in preparation for dye transfer to a subsequent receiver film.

A dye transfer printing system in accordance with the present invention substantially reduces the length of pin belt necessary for an individual dye transfer path, and allows the system to operate at substantially higher speeds than traditional pin belt systems to produce film prints in substantially greater volume in a commercially feasible manner. For example, in one aspect, a roll tank in accordance with the present invention may include rollers having a predetermined hardness and which apply a predetermined pressure to the two-film sandwich to promote adhesion and/or dye transfer at substantially higher speeds than previous systems.

In addition, a pin belt in accordance with the present invention may have an orbital path or peripheral length substantially less than about 200 feet, and preferably about 22 feet. The pin belt includes specially designed and/or arranged pins adapted to facilitate seating and stripping of the films from the pin belt at relatively high speeds without substantial risk of damaging the films. Thus, the pin belt may be operated at speeds of about 800 feet per minute or more, and preferably between about 1,000 and 1,200 feet per minute, without substantial risk of damaging and/or misaligning the two-film sandwich during seating and subsequent stripping. These parameters result in the two-film sandwich being on the pin belt for not more than about 1 or 2 seconds, that is, substantially less than 10% of the about 45–50 seconds generally needed for complete dye transfer.

Thus, a dye transfer apparatus in accordance with the present invention substantially completes dye transfer without a pin registration device such as the pin belt, and preferably while the two-film sandwich is directed along a pinless substantially rectilinear path, such as within the transfer cabinet. The film path preferably has a length that is sufficiently long such that the two-film sandwich travel through the transfer cabinet in about 45–50 seconds, thereby allowing complete dye transfer to occur therein. The substantially rectilinear path defined by the relatively large diameter rollers and the natural adhesion of the films promoted by the tension adjustment provided by the elevator mechanism allow the transfer cabinet to maintain the two-film sandwich in precise registration without the need for pins or sprockets, thereby allowing the films to travel along the film path at substantially higher speeds than previously available.

Accordingly, a principal object of the present invention is to provide a dye transfer apparatus that substantially reduces the length of pin belt needed to maintain a matrix film and a receiver film in precise registration during dye transfer.

It is also an object to provide an improved apparatus and method for maintaining in precise registration a receiver film superimposed onto a dye imbibed matrix film as they travel at relatively high speeds along a continuous path;

It is also an object to provide an improved system for processing dye transfer prints of professional motion picture films at substantially higher speeds than those available using prior dye transfer systems.

It is also an object to provide an improved roll tank for seating a dye imbibed matrix film and a receiver film together to facilitate dye transfer under high speed conditions.

It is also an object to provide an improved pin belt for seating receiver and matrix films thereon, and for stripping the films therefrom under high speed conditions.

Other objects and features of the present invention will become apparent from consideration of the following description taken in conjunction with the accompanying drawings.

BRIEF DESCRIPTION OF THE DRAWINGS

FIG. 6 is a cross-sectional elevation along line 6—6 of FIG. 1 of the transfer cabinet of FIG. 5.

FIG. 7 is an elevation view of a machined stripping roller for separating matrix and blank films after dye transfer.

FIG. 8 is an alternate elevation view of the stripping roller of FIG. 7 taken along line 8—8.

DETAILED DESCRIPTION OF THE PREFERRED EMBODIMENTS

Figure 1:
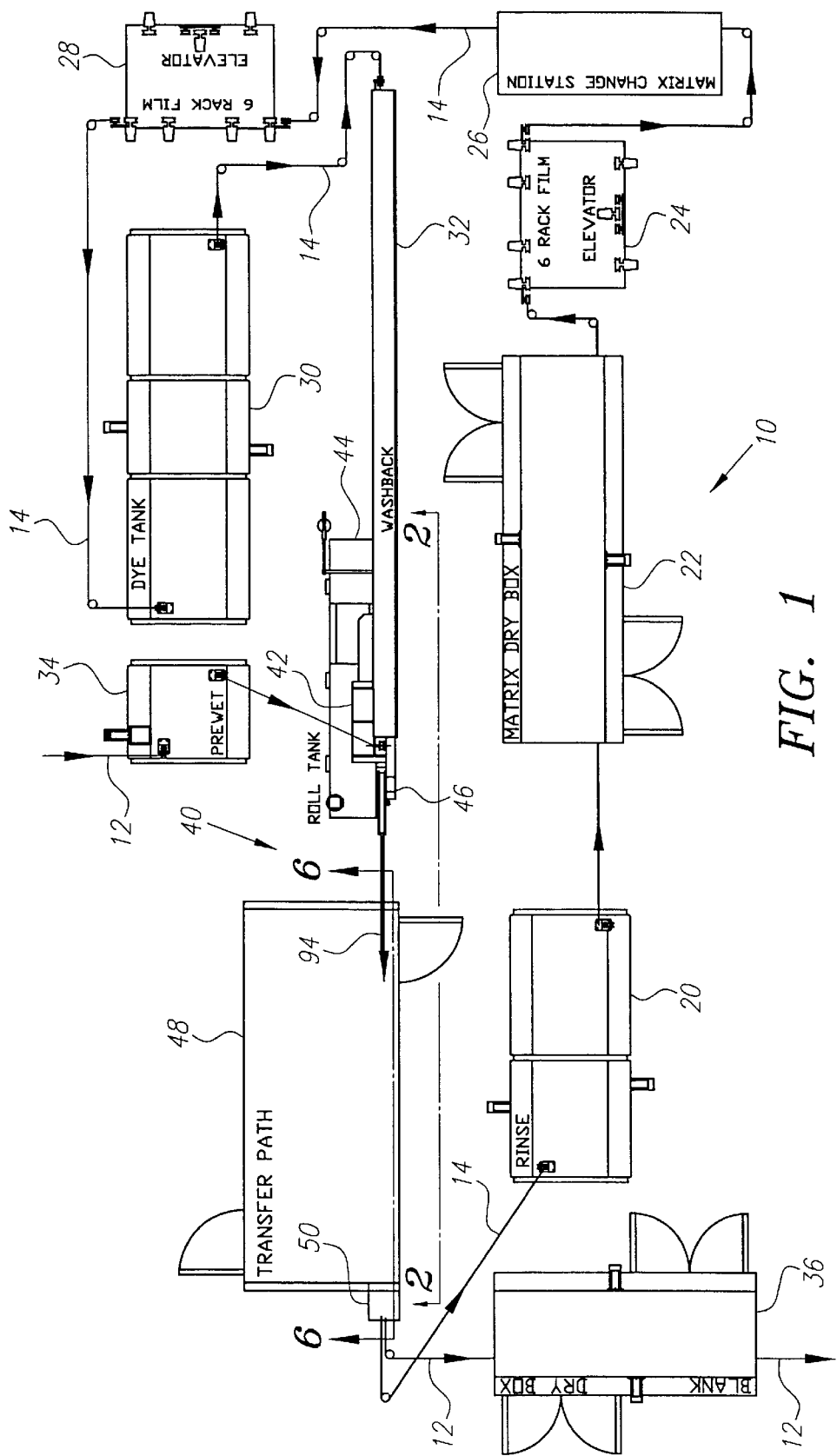
FIG. 1 is a schematic plan view of a dye transfer system in accordance with the present invention.

Turning now to the drawings, FIG. 1 shows a schematic plan of a dye transfer system 10 in accordance with the present invention. Generally, the system 10 is used to print a copy of a professional motion picture using a three color dye transfer process. A blank or receiver film 12 is provided into which dye is transferred to create the copied print (called an imbibition dye transfer print or an "IB print"), and a matrix film 14 is provided to transfer a colored dye into the blank film 12. The materials and construction of the films for example the polyester film base used, as well as their chemical properties, are known and will not be addressed herein.

The system 10 includes a continuous path or loop for the matrix film 14 and a continuous path for the blank film 12. The matrix film path 14 includes equipment for applying dye to the matrix film, namely a dye tank 30, a washback system enclosure 32, and includes a dye transfer apparatus 40 for completing dye transfer to the blank film 12.

Turning now to FIGS. 2–9, a dye transfer apparatus 40 in accordance with one aspect of the present invention is shown. The apparatus 40 includes a roll tank 42, a pin belt apparatus 44, a first stripping roller 46, a transfer path cabinet 48, and a second stripping roller 50.

Figure 3:
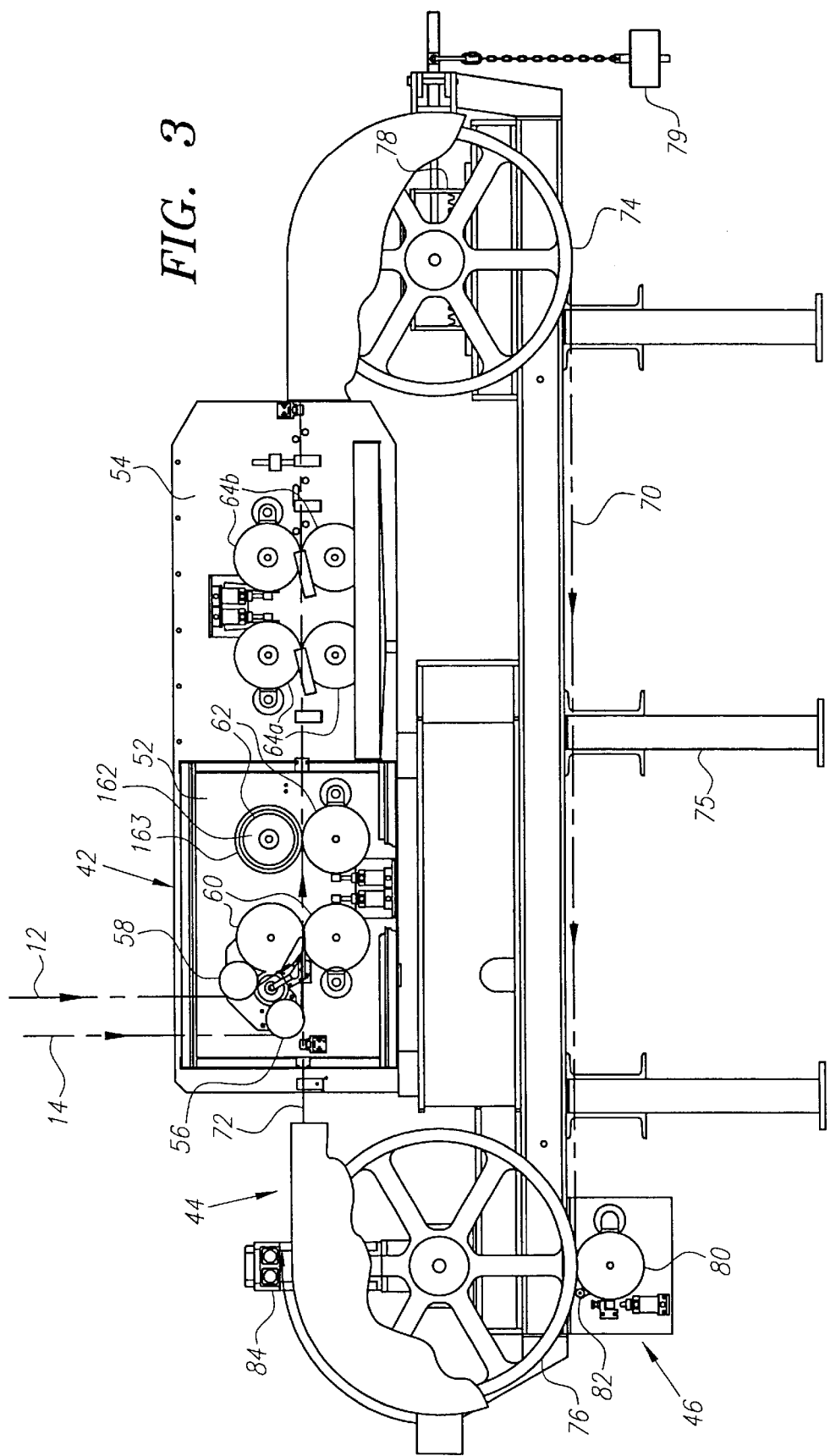
FIG. 3 is an enlarged view of the roll tank and pin belt of FIG. 2.

With particular reference to FIG. 3, the roll tank 42 includes a wet section 52 and a dry section 54. Each section 52, 54 is preferably a substantially enclosed separate chamber within the roll tank 42 connected by openings through which the blank film 12, the matrix film 14 and the pin belt 70 (all shown in phantom) may travel. The roll tank 42 also includes a plurality of rollers 56–64, preferably having substantially smooth perimeters, rotatably fixed in a predetermined relationship within the roll tank 42.

For example, the wet section 52 includes a roller 56 which receives the dye imbibed matrix film 14 and guides it onto the pin belt 70. Roller 58 receives the blank film 14 and directs it towards a first pair of rollers 60. The first pair of rollers 60 cooperatively direct the blank film 12 onto the pin belt 70 and superimpose the blank film 12 onto the matrix film 14 in a predetermined registration to create a two-film sandwich 16 (not shown in FIG. 3). Alternatively, the pre-wet blank film 12 may be seated first on the pin belt 70, followed by the matrix film 14. The second pair of rollers 62 apply a predetermined pressure to further seat the films 12, 14.

The wet section 52 preferably includes conditions that facilitate initial seating and adhesion of the films 12, 14. For example, water may be injected or sprayed between the films 12, 14 as they are being seated onto the pin belt 70. Alternatively, the wet section 52 may be filled with water into which the films 12, 14 may be totally immersed. The water allows the films 12, 14 to move into registration with one another, and the subsequent removal of that water under pressure removes entrained air and promotes the natural adhesion of the two-film sandwich 16, i.e., the tendency of wet films to adhere substantially to one another, to help reduce misalignment and maintain the films 12, 14 in precise registration.

Preferably, temperature-controlled water, i.e. water that is heated to a predetermined temperature is injected between the films 12, 14 as they are being placed in intimate contact with one another. For example, water at temperatures of between about 100–110 degrees Fahrenheit, and preferably about 105 degrees, may be appropriate for this purpose. In addition, one or more additives may be provided in the water to promote adhesion and/or facilitate dye transfer. For example, it may be appropriate to add calcium or a similar material to control water hardness, e.g. to slightly harden the water injected between the films 12, 14.

The dry section 54 includes two pairs of rollers 64a, 64b which also apply a predetermined pressure to the two-film sandwich 16 and remove excess water from between the films 12, 14 for optimum dye transfer. The location of the rollers 56–64 within the roll tank 42 and in relation to each other may be manually and/or automatically adjustable to maintain the predetermined registration and the predetermined pressure.

Preferably, the relative positions of the pairs of rollers 60–64 are pneumatically controlled to apply the predetermined pressure to the two-film sandwich 16, typically between about 12 psi and about 30 psi. For example, the wet section rollers 60, 62, may apply pressures of between about 18–25 psi to the films 16, with about 25 psi presently being most preferred. The dry section rollers 64a, 64b may apply pressures of between about 10–25 psi, with 25 psi being preferred for the first pair of rollers 64a, and 15 psi being preferred for the second pair of rollers 64b.

In addition, the rollers 60–64 also preferably have predetermined hardnesses to enhance point-to-point contact and to drive out the excess water and entrained air to further promote optimum adhesion and/or dye transfer. Generally, the rollers 60–64 have a rigid inner rim (e.g. rim 162 on roller 62), which may be furnished from brass or other conventional material, and an annular tire (e.g. tire 163 on roller 62) furnished from rubber or similar material having a predetermined hardness. For example, hardnesses of between about 65A and about 85A (Shore Durometer) have been found to be useful for the present invention. Preferably, the upper rollers 60, 62, 64a and 64b have hardnesses of about 75A, 65A, 85A and 75A respectively, while the lower rollers 60, 62, 64a, and 64b all preferably have a hardness of about 75A. The predetermined hardnesses and pressures of the pairs of rollers 60–64 provide improved conditions for maintaining the films 12, 14 in precise registration during the high speeds of the present dye transfer system.

Figure 2:
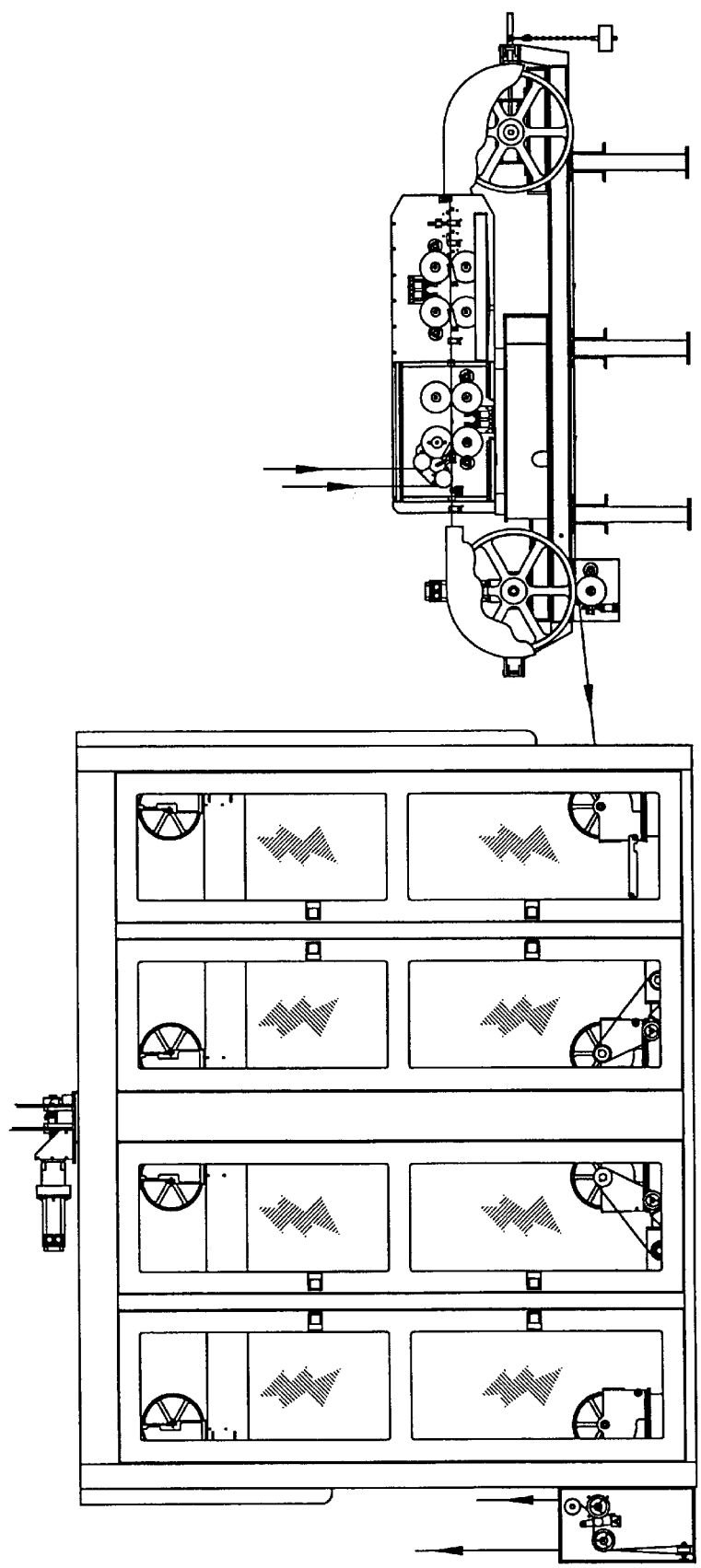
FIG. 2 is an elevation view taken along line 2—2 of FIG. 1, showing a dye transfer apparatus in accordance with the present invention, including a pin belt and a transfer cabinet.
Figure 4:
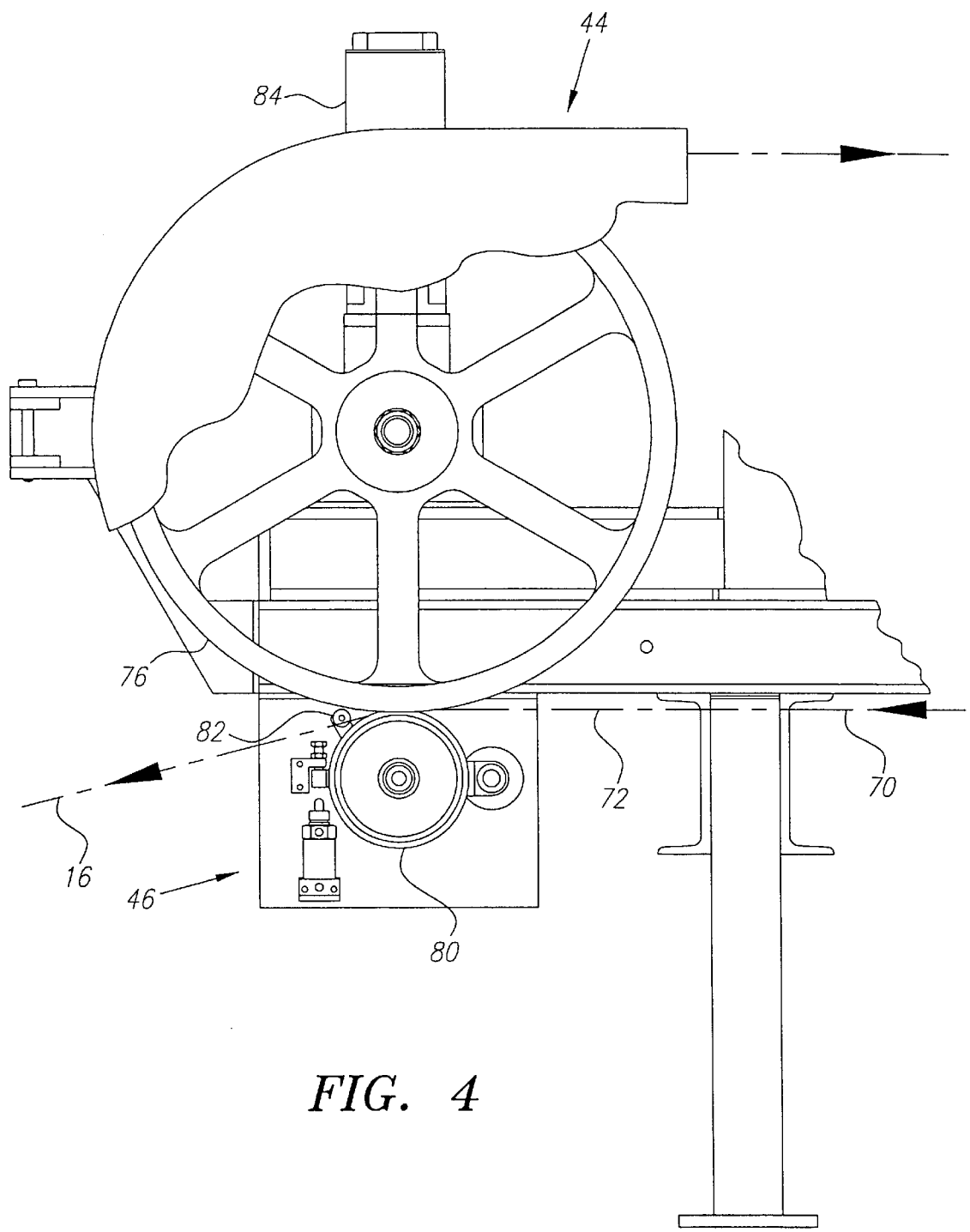
FIG. 4 is an elevation view of a machined stripping roller for removing a two-film sandwich from a pin belt.
Figure 5:
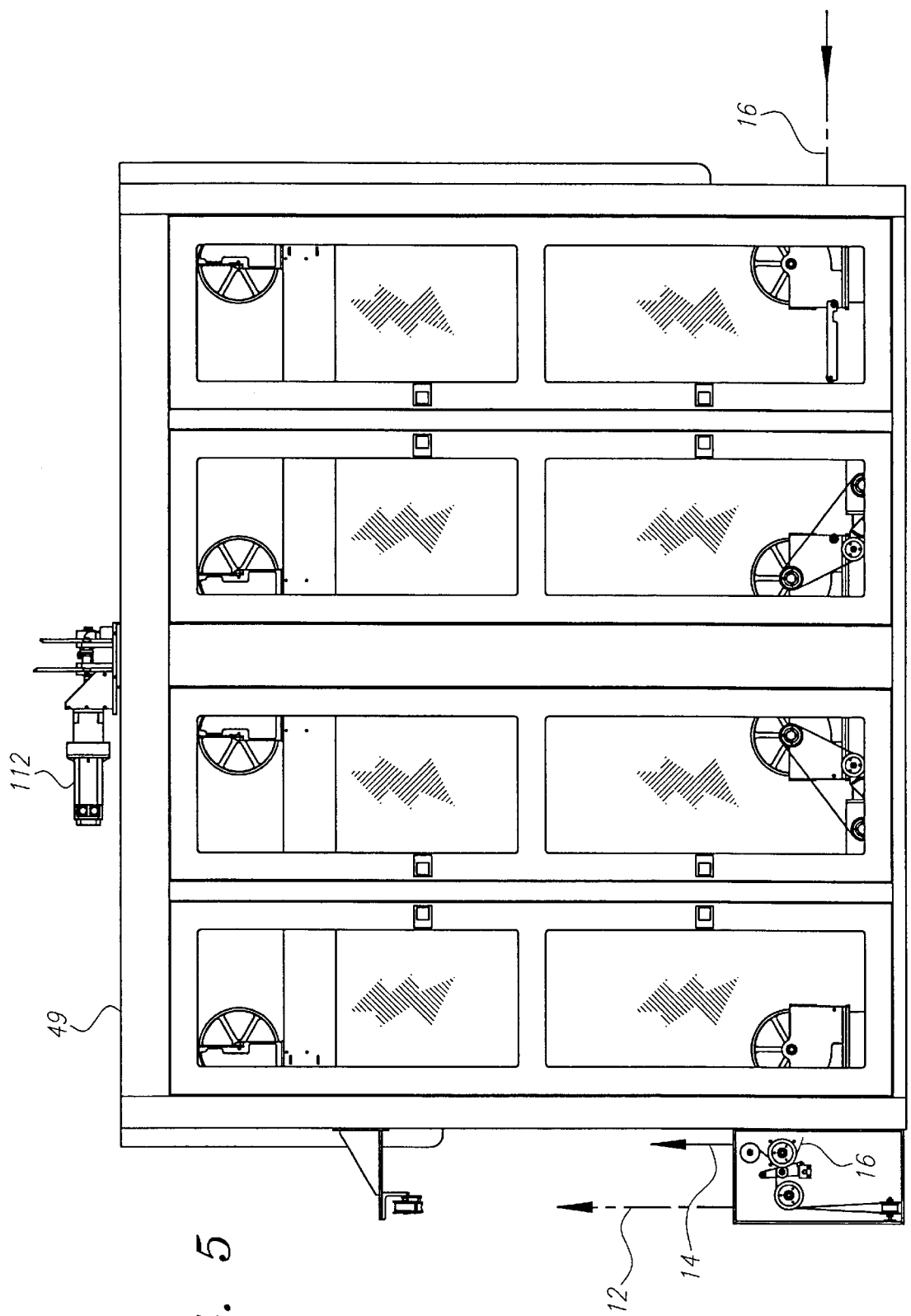
FIG. 5 is an enlarged view of the transfer cabinet of FIG. 2.

With particular reference to FIGS. 2–4, the pin belt apparatus 44 is shown which includes the pin belt 70 and a pair of wheels 74, 76 supported by a conventional frame structure 75. The pin belt 70 is an endless ribbon traveling in an orbital path 72 (shown in phantom) around and between the two wheels 74, 76. The pin belt 70 is preferably produced from stainless steel using known methods and constructions, and has a periphery defined by said orbital path 72, preferably substantially less than about 200 feet, and more preferably between about 18 and about 22 feet in length. The wheel 74 is adjustably mounted to the frame 75 and may freely rotate, while the wheel 76 is motor-driven, thereby allowing the pin belt to engage the wheels and travel along the orbital path 72. A weighted rack and pinion apparatus 78 allows the location of wheel 74 to be adjusted and substantially locked, thereby regulating the distance between the wheels 74, 76 and applying a predetermined tension to the pin belt 70 proportional to the weight 79. The servo-motor 84 drives the wheel 76, thereby controlling the speed of the pin belt 70 and applying further desired tension to the two-film sandwich 16 traveling along the orbital path 72.

Figure 10A:
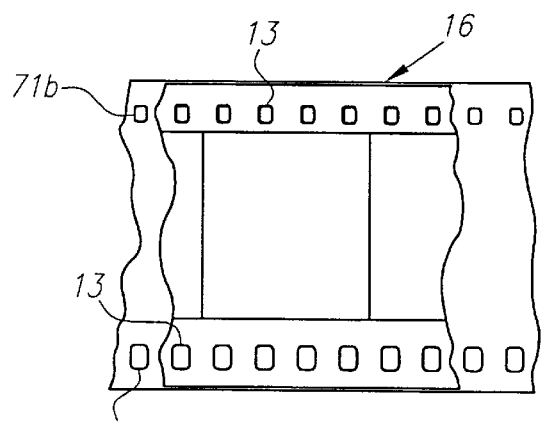
FIG. 10A is a plan view of a segment of a two-film sandwich on a pin belt.
Figure 10B:
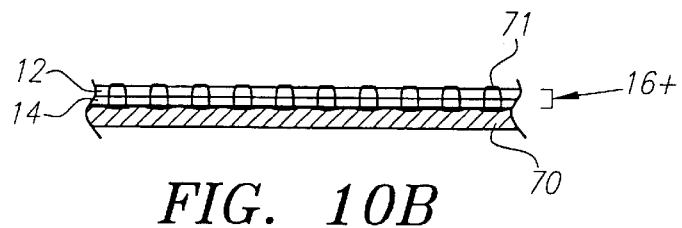
FIG. 10B is a side view of the two-film sandwich and pin belt of FIG. 10A.
Figure 10C:
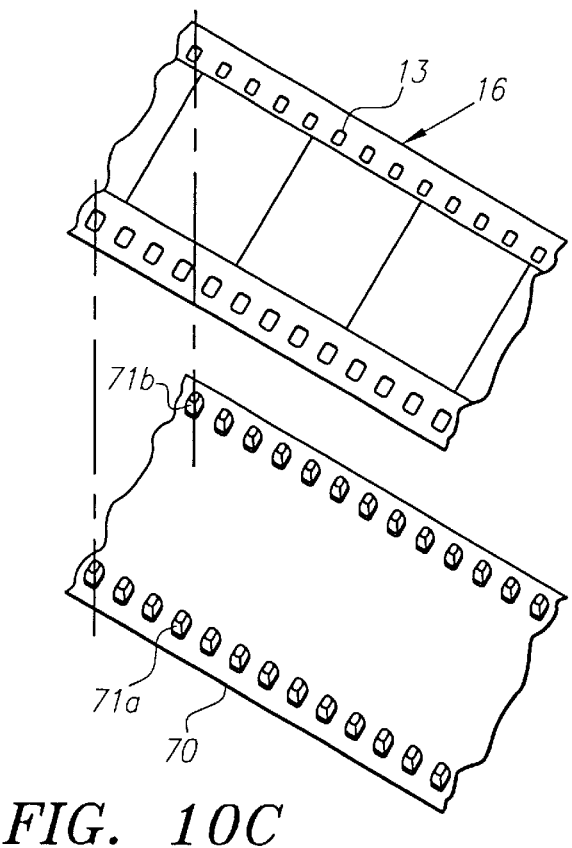
FIG. 10C is an exploded perspective view of the sandwiched film and pin belt of FIG. 10A.

As shown in FIGS. 10A–10C, the pin belt 70 includes a plurality of pins or teeth 71 substantially permanently attached to or integrally formed on the outer surface of the pin belt 70, preferably being force fit through pre-punched openings spaced along the pin belt ribbon. Preferably the pins are spun from coin silver to a predetermined shape adapted to facilitate the pin belt 70 detachably receiving and engaging perforations or sprocket holes 13 in the two-film sandwich 16. The pins 71 also have a predetermined spacing therebetween for substantially maintaining the two-film sandwich 16 in precise registration as they travel along the orbital path 72 (e.g. about 0.187275 inches).

Preferably, the pin belt 70 has a pairs of pins 71*a*, 71*b* spaced along the length of the pin belt 70, the pins within each pair being spaced apart across a width, e.g. about 1.109 inches, of the pin belt 70, thereby corresponding to the two sets of sprocket holes provided on conventional film strips. More preferably, one set of pins 71*a* is "full-fitting," that is, has a shape and size substantially similar to the corresponding holes 13 in the films 16, while the other set of pins 71*b* has a substantially smaller size, e.g. smaller width and/or length, thereby promoting stability of the two-film sandwich 16 yet facilitating their removal from the pin belt 70 at relatively high drive speeds. Alternatively, only a single set of pins (not shown) adjacent one edge of the pin belt 70 may also provide sufficient stability to engage the two-film sandwich 16 and maintain the films 12, 14 in precise registration.

Figure 11A:
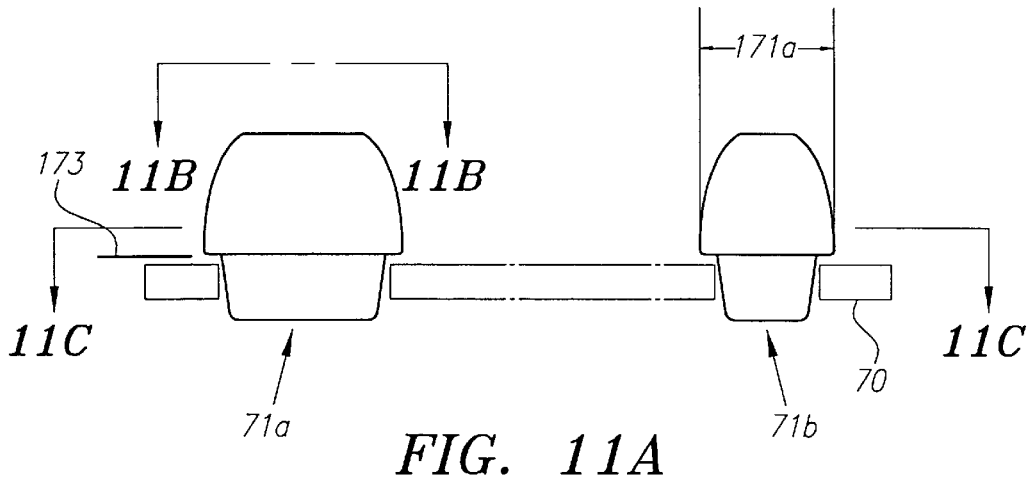
FIG. 11A is a cross-section of a pair of pins for a pin belt (shown in phantom) in accordance with the present invention.
Figure 11B:
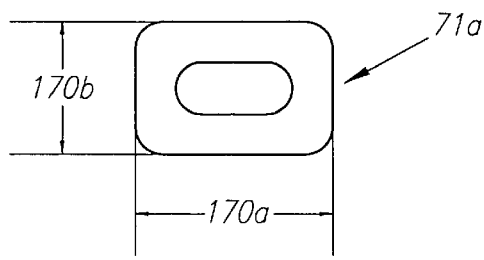
FIG. 11B is a top view of one of the pins of FIG. 11A.
Figure 11C:
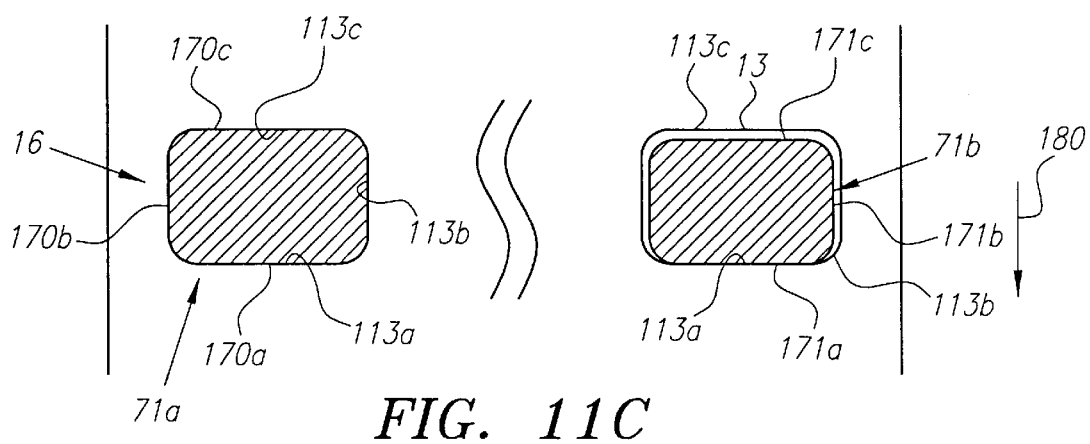
FIG. 11C is a detail of a pair of pins with a two-film sandwich seated thereon.

Turning to FIGS. 11A–11C, a portion of a preferred embodiment of a pin belt 70 (shown in phantom in FIG. 11A) is shown having a full-fitting pin 71*a* adjacent a smaller pin 71*b*. The pin 71*a* has a substantially rectangular shape corresponding to the shape of the sprocket holes 13 of the two-film sandwich film 16, preferably having rounded edges. The pin 71*a* has a substantially domed or mushroom cross-section for facilitating the seating and stripping of the films 16 on and from the pin belt 70 under high speed conditions. The smaller pin 71*b* also has a substantially rectangular shape and a domed cross-section, although smaller in width and length than the full-fitting pin 71*a*.

Preferably, the pins 71*a*, 71*b* are fastened to the pin belt 70 such that the front surfaces 170*a*, 171*a* are parallel and adjacent to one another. Thus, the front surfaces 170*a*, 171*a* both substantially engage the leading edge 113*a* of the sprocket holes 13 on the two-film sandwich 16 to maintain the films in precise registration as they are directed along the orbital path (not shown) in the direction indicated by arrow 180. The rear surface 170*c* of the full-fitting pin 71*a* substantially engages the trailing edge 113*c* of the sprocket hole 13, while the rear surface 171*c* of the smaller pin 71*b* does not. Similarly, the side surfaces 171*b* of the smaller pin 71*b* do not engage the side edges 113*b* of the sprocket 13.

For example, the full-fitting pin 71*a* may have a height 173 of about 0.625 inch, a width 170*a* of about 0.110 inch, and a length 170*b* of about 0.078 inch (corresponding substantially to the width and length of the sprocket hole 13). The smaller pin 71*b* may have a height 173 of about 0.625 inch, a width 171*a* of about 0.100 inch, and a length less than about 0.073 inch.

Attached to the pin belt machine 44 is the first stripping roller 46 which generally includes one or more rollers for stripping or guiding the two-film sandwich 16 from the pin belt 70. Preferably, the first stripping roller 46 includes a substantially smooth perimeter roller 80 which facilitate removing the two-film sandwich 16 from the pins of the pin belt 70.

As can be seen from FIG. 3, the roll tank 42 and the first stripping roller 46 are generally attached to or integrally formed on the pin belt apparatus 44. Preferably, the roll tank 42 is mounted on a central, upper portion of the pin belt apparatus 44, whereby the blank and matrix films 12, 14 are directed onto a substantially flat segment of the pin belt 70. Similarly, it is preferred that the first stripping roller 46 be mounted adjacent a flat segment of the pin belt 70 to facilitate removal of the two-film sandwich 16 therefrom. Thus, the two-film sandwich 16 preferably travels along only a portion of the orbital path 72 between the roll tank 42 and the first stripping roller 46. Alternatively, however, each component may be provided separately or may be mounted in alternative configurations to that shown without substantially affecting the operation of the apparatus 40.

Turning now to FIGS. 5–9, the transfer cabinet 48 is shown which includes an arrangement of elevator-controlled rollers 86–92 mounted within a substantially enclosed cabinet 49. The cabinet 49 includes openings (not shown) into and out of the cabinet 49 to a continuous film path 94 along which the two-film sandwich 16 may be directed, for example, from the pin belt apparatus 44 into the transfer cabinet 48, and from the transfer cabinet 48 to the second stripping roller 50.

Generally, within the transfer cabinet 48, the rollers 86–92 are rotatably mounted in a predetermined relationship to one another to provide the continuous film path 94 along which the two-film sandwich 16 may travel. The film path 94 defined by the rollers 86–92 should provide sufficient length and time for complete dye transfer to occur substantially within the transfer cabinet 48.

Preferably, the rollers 86, 88, 92 are mounted in banks, sharing common axles 96, 98 and support frames 100. Rollers 90 are mounted independently in banks using support frames 102. In addition, the banks are slightly offset from one another, such that the arrangement of rollers 86–92 defines one or more substantially helical paths defining the overall film path 94. Preferably, the arrangement of the rollers 86–92 defines a film path 94 having a length substantially higher than about 205 feet, preferably between about 600 and about 1,000, and most preferably between about 750 and about *900* feet. Thus, the two-film sandwich 16 remains in the transfer cabinet 48 for between about 45–50 seconds, and preferably not more than about 45 seconds, while traveling at drive speeds substantially greater than about 330 feet per minute, preferably between about 800–1,200, and most preferably between about 1,000–1,200 feet per minute, or more.

Figure 9:
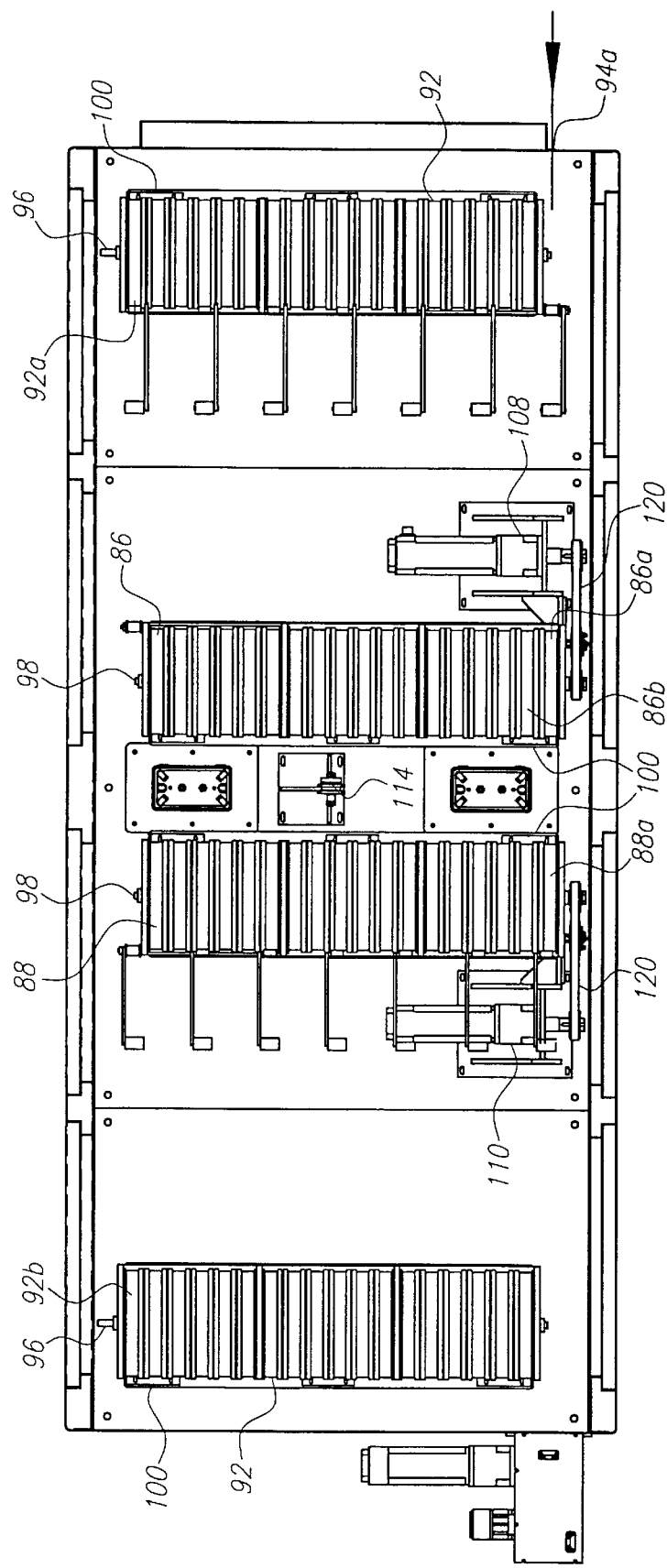
FIG. 9 is a cross-sectional view of the transfer cabinet of FIG. 6 taken along line 9—9.

For example, as shown in FIGS. 6 and 9, the transfer cabinet 48 preferably includes two similar sets of rollers 86–92, in substantially opposite-hand arrangements 104, 106. The banks of rollers 86, 88, 92 have 18 rollers each mounted on common axles 96, 98 and frames 100, while banks of rollers 90 have 18 rollers mounted on frames 102. The film path 94 of the transfer cabinet 48 is defined by a series of substantially straight paths extending between the rollers 86–92 which begins at a point 94*a* where the two-film sandwich 16 enters the transfer cabinet 48. A first roller 86*a* diverts the film path 94 vertically along path 94*b* to a second roller 90. The film path 94 then follows the additional rollers 90, 92 along paths 94*c*, 94*d*, and 94*e* at which point, because of the offset of the banks, the path 94 loops helically back to roller 86*b* adjacent to roller 86*a*.

The path 94 then extends helically along the banks of rollers 86, 90, and 92 until roller 90*a*. At that point, the path 94 extends along path 94*f* to roller 90*b* in the second arrangement 106. The film path 94 then follows paths 94*g*, 94*h*, and 94*i* helically through the second arrangement 106 of rollers 88–92, until roller 88a, whereupon path 94j leads out of the transfer cabinet 48.

In addition, the rollers 86–92 preferably have diameters that are substantially larger than the diameters of the rollers used elsewhere in the apparatus 40 and those used in previous dye transfer systems, for example substantially larger than about 4 inches, and preferably between about 9 inches and 18 inches. The larger diameters result in the perimeters of the rollers 86–92 defining substantially rectilinear paths, that is, the perimeters are sufficiently large compared to the thickness of the two-film sandwich 16 that the rollers 86–92 behave similarly to a substantially straight path rather than a tightly curved path. Thus, the two-film sandwich 16, although traveling helically along the film path 94 through the arrangement of rollers 86–92, follows a substantially rectilinear path. Rollers having diameters of about 11⅞ inches are presently most preferred for providing a desired substantially rectilinear path.

In addition, unlike a pin belt, the rollers 86–92 are toothless and have substantially uniform perimeters, that is, they have no sprockets for engaging the holes in the two-film sandwich 16. As the two-film sandwich 16 travels around the perimeter of a relatively small diameter roller, the blank and matrix films 12, 14 may have a tendency to shift or slide in relation to one another, thereby compromising the registration needed for proper dye transfer. Thus, small diameter rollers usually have sprockets to engage the two-film sandwich 16 and maintain the films 12, 14 in precise registration. In contrast, as the two-film sandwich 16 travels around the perimeters of the rollers 86–92, the films 12, 14 do not tend to slide in relation to one another because of the substantially rectilinear paths defined by the relatively large diameters of the rollers 86–92. Thus, the rollers 86–92 do not need sprockets, pins or teeth which may risk damaging the two-film sandwich 16.

The transfer cabinet 48 generally also includes an elevator mechanism for adjusting the predetermined relationship of the rollers 86–92 to provide a desired or predetermined tension on the two-film sandwich 14 traveling along the film path 94. With particular reference to FIG. 6, the elevator mechanism includes a tension drive motor 112 for controlling the vertical position of the rollers 90. The tension drive motor 112 has a roller chain 114 attached thereto which also communicates with a carriage or beam 116. The carriage 116 is a substantially rigid frame assembly that is slidably attached to rails 118, thereby allowing the carriage 116 to be precisely adjusted vertically within the cabinet 49, as the motor 112 drives the chain 114 (e.g. between an upper position during operation and a lower position for service and maintenance, both of which are shown). The rollers 90 are mounted on frames 102 which are attached to the carriage 116 as shown, thus allowing the distance (represented by paths 94b, 94d, 94g, and 94i) between the upper rollers 90 and the lower rollers 86, 88, and 92 to be adjusted, and thereby adjusting the tension of the two-film sandwich 16 traveling along the film path 94.

The carriage 116 is manually controlled, thereby allowing an operator to adjust the tension and/or to lower the carriage 116 for maintenance. Alternatively, one or more banks or individual rollers may be adjustable within the transfer cabinet 48 to provide suitable tension adjustment. In a further alternative, the elevator mechanism may include one or more interacting sensors and servo-motors (not shown) which measure actual tension experienced by the two-film sandwich 16 traveling along the film path 94, and precisely move one or more rollers in relation to the others in response to the actual tension measurements. Thus, the sensors and servo-motors may be used to adjust the actual tension towards the predetermined tension, thereby further maintaining the films 12, 14 in precise registration.

In addition, the transfer cabinet 48 includes a pair of synchronized drive motors 108, 110. The motors 108, 110 drive the axles 98 of the bank of rollers 86, 88, thereby controlling the distribution of tension of the two-film sandwich 16 traveling along the film path 94. Preferably, the axles 98 and motors 108, 110 comprise a tangentially driven system, as will be familiar to those skilled in the art. In addition, while the motor 108 draws the two-film sandwich 16 from the pin belt 70 into the transfer cabinet 48, the motor 110 draws the two-film sandwich 16 through the film path 94. Thus, the speed of the motors 108, 110 may be adjusted relative to one another to provide further tension control of the two-film sandwich 16 traveling along the film path 94.

Preferably, the motor 112 applies a relatively high tension to the two-film sandwich 16 as it travels along the film path 94, as compared to when the two-film sandwich 16 travels along the orbital path 72 on the pin belt 70, thereby enhancing the films 12, 14 remaining in precise register within the transfer cabinet 48. For example, the motor 112 may apply a tension of about 7–8 pounds to the two-film sandwich 16, while the two-film sandwich 16 may only be subjected to about 2–3 pounds of tension while on the pin belt 70.

The transfer cabinet 48 is preferably maintained at predetermined atmospheric conditions for optimizing complete dye transfer in a predetermined time. For example, the chamber within the transfer cabinet 48 may be heated to temperature of between about 110 and about 120 degrees Fahrenheit, preferably about 112 degrees Fahrenheit, thereby providing conditions for complete dye transfer to occur in about 45–50 seconds. The temperature within the transfer cabinet 48 may be reduced, possibly as low as ambient temperatures, but this may increase the time needed for complete dye transfer (i.e. the time that the two-film sandwich 16 must remain within the transfer cabinet 48), and consequently increase the required length of the film path 94. Increasing the temperature may shorten the transfer time, but may also risk damage to the films as they are separated from each other. In addition, temperatures of about 140 degrees and higher may cause the films to become brittle and/or to curl at their edges. In addition, the transfer cabinet 48 is also preferably maintained at a relative humidity of between about 45% and about 50%. Such humidity may facilitate transporting of the two-film sandwich 16 over the surface of the rollers, by reducing friction. Substantially lower humidity conditions, for example around 10 percent or less may cause the films to curl or otherwise damage the films.

Turning now to FIGS. 6–8, the second stripping roller 50 is shown, which includes a plurality of rollers arranged in a predetermined orientation. For example, cooperating sprocket 120 and roller 124 are adapted to "strip" or separate the two-film sandwich 16 into the blank film 12 (with the dye transferred thereon) and the matrix film 14. The roller 124 may be mounted on an adjustable keeper assembly 122, and the sprocket 120 may be driven by a servo-motor 132 to decouple the tension applied within the transfer cabinet 48 (e.g. to reduce the tension of the two-film sandwich 16 to about 2 pounds) and drive the matrix film 14.

The roller 126 then directs the matrix film 14 out of the second stripping roller 50 and through the matrix film loop 14, as discussed below. The sprocket 128 and roller 130 direct the blank film 12 out of the second stripping roller 50 for subsequent processing, e.g. to the blank dry box 36 (see FIG. 1). The sprocket 128 has a motor 134 connected thereto to drive the blank film 12 after separation from the matrix film 14.

A dye transfer apparatus in accordance with the present invention allows dye transfer to occur at substantially higher drive speeds than previously available using traditional pin belt systems. For example, if a drive speed of about 1,000–1,200 feet per minute is desired and conditions are such that the two-film sandwich must remain superimposed in precise register for about 45 seconds, a path length of about 750–900 feet is needed. Thus, a traditional pin belt apparatus operating at such speeds would have to be hundreds of feet long, requiring substantial space. In contrast, a transfer cabinet in a dye transfer apparatus in accordance with the present invention may provide between about 750–900 feet of film path length in only about 50 square feet (e.g. a transfer cabinet having a foot print of about 10 feet by it 5 feet).

Returning to FIGS. 1 and 2, a system and method of processing a color print by dye transfer in accordance with the present invention is shown. Referring first to the matrix portion of the system 10, the matrix film 14 is provided in a substantially continuous loop that is fed through a series of equipment, including a rinse tank 20, a matrix dry box 22, a first elevator mechanism 24, a matrix change station 26, a second elevator mechanism 28, a dye tank 30, and a washback tank 32, all of which are substantially conventional. The matrix film 14 is then directed through a dye transfer apparatus in accordance with the present invention, such as the preferred embodiment described above.

The rinse tank 20 sprays water onto the surface of the matrix film 12 to remove any residue remaining thereon from a previous dye transfer cycle. The matrix dry box 22 then dries the rinsed matrix film 14 as it passes therethrough, typically using forced hot air. The matrix film 14 passes through the matrix change station 26 which allows the matrix to be changed-out between cycles and replaced with a new matrix film 14, and/or provides continuity for the matrix film 14 traveling around the loop.

Elevator mechanisms are provided, which include one or more motor-driven rollers or other driving mechanisms (not shown) for drawing the matrix film 14 through the loop, and a plurality of rollers (not shown) in an adjustable relationship to one another for controlling tension on the matrix film 14. For example, as shown, a first elevator mechanism 24 draws the matrix film 14 from the dye transfer apparatus 40 through the rinse tank 20 and the matrix dry box 24. A second elevator mechanism 28 is also provided which draws the matrix film 14 from the matrix change station 26.

The matrix film 14 then enters the dye tank 30 which includes a plurality of spray nozzles (not shown) for spraying a particular color dye into the surface of the matrix film 14, substantially soaking the surface of the matrix film 14. The matrix film 14 then travels to the washback tank 32 which includes a plurality of nozzles (not shown) for spraying water onto the matrix film 14, thereby removing excess dye from the surface thereof to control the color ratio of the completed print. Thus, when the matrix film 14 emerges from the washback tank 32, it is properly dye imbibed and ready for dye transfer into the blank film 12.

Turning now to the blank film portion of the system 10, the blank or receiver film 12 is directed along a continuous path, including a pre-wet tank 34, the dye transfer apparatus 40, and a blank dry box 36. The pre-wet tank 34 sprays water onto the blank film 12 to moisten a gelatin or other absorbent material on the surface thereof for receiving dye.

The blank and matrix films 12, 14 are then directed into the roll tank 42, where they are superimposed together under a predetermined pressure in a predetermined registration to create the two-film sandwich 16. The films 12, 14 are directed onto the pin belt 70, which guides them partially around the orbital path 72 thereof. The first stripping roller 46 removes the two-film sandwich 16 from the pin belt 70 and directs it into the transfer cabinet 48.

The two-film sandwich 16 is then directed along the film path 94 (not shown in FIG. 2) defined by the plurality of rollers 86–92 for sufficient time for dye transfer to be substantially completed. Although part of the dye transfer process may occur prior to the transfer cabinet 48, it is preferred that substantially all or most of the process occur in the transfer cabinet, rather than on the pin belt 70. Preferably, less than 10% of the time that the blank and matrix films 12, 14 remain in precise contact should occur on the pin belt 70 and/or outside the transfer cabinet 48.

Thus, the pin belt 70 acts primarily as a seating device, allowing the films 12, 14 to be initially superimposed in precise register thereon. The two-film sandwich 16 may then be removed therefrom and directed into an apparatus, such as the transfer cabinet 48, where dye transfer substantially occurs without using a registration device, such as pins, which engage the sprocket holes of the films 12, 14 to keep them in precise registration. Preferably, the transfer cabinet 48 defines a chamber that provides substantially stable atmospheric conditions to promote dye transfer in a predetermined transfer time, for example, the predetermined temperatures and/or humidity discussed above.

The precise register of the two-film sandwich 16 is enhanced throughout the orbital path 72 and the film path 94 traveled by promoting the adhesion and controlling the tension of the two-film sandwich 16. The pins on the pin belt 70 substantially prevent the tensioned two-film sandwich 16 from misaligning during seating on the pin belt 70. Within the transfer cabinet 48, in addition to the substantially rectilinear path provided by the relatively large diameter rollers 86–92, the tension control of the elevator mechanism protects the adhesion between the two-film sandwich 16 to maintain the films 12, 14 in precise registration throughout the film path 94.

The predetermined relationship of the rollers 86–92 may be manually and/or automatically adjusted in response to the actual tension experienced by the two-film sandwich 16, for example using the tension motor assembly 112–116, thereby maintaining the tension substantially at a predetermined tension that promotes the sandwiches films 16 remaining in precise registration. The drive speeds of the synchronized motors 108, 110 may also be adjusted to further maintain the distribution of the predetermined tension and promote precise register of the two-film sandwich 16.

Finally, after complete dye transfer has substantially occurred, the second stripping roller strips the blank film 12 from the matrix film 14. The blank dry box 36 dries the blank film 12 after dye transfer in the dye transfer apparatus 40, in preparation for continuing on to another system (not shown), e.g. for transferring an additional color or for removing the finished print.

Although only a single system 10 and matrix 14 are shown, it will be appreciated by those skilled in the art that three systems 10 are generally necessary to produce a finished copy of a motion picture. One system 10 is provided for each color dye (e.g. cyan, magenta, and yellow) being transferred into the blank film 12, the blank film 12 running sequentially through each system 10. Thus, a blank film 12 will pass through three dye transfer apparatus 40, with a single color being applied within each apparatus 40, thereby producing a three color finished print of a film.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method for transferring dye from a dye imbibed matrix film to a receiver film for producing a dye transfer print of a motion picture print, comprising:

superimposing a dye imbibed matrix film and a receiver film together in precise registration on a seating apparatus to create a two-film sandwich;

stripping the two-film sandwich from the seating apparatus before completing dye transfer; and completing dye transfer from the matrix film to the receiver film along a pinless, substantially rectilinear film path while maintaining the two-film sandwich in precise registration.

2. The method of claim 1, wherein the superimposing step comprises engaging sprocket holes in the matrix and receiver films with precisely spaced pins on the seating apparatus, thereby maintaining the two-film sandwich in precise registration.

3. The method of claim 2, wherein the seating apparatus comprises a ribbon to which the pins are attached.

4. The method of claim 1, wherein the seating apparatus comprises a plurality of rollers for cooperatively superimposing the matrix film and the receiver film in a predetermined registration with one another.

5. The method of claim 1, wherein the superimposing step comprises immersing the matrix film and the receiver film in water.

6. The method of claim 1, wherein the step of completing dye transfer comprises directing the two-film sandwich around a portion of and between a plurality of sprocketless rollers.

7. The method of claim 1, wherein the two-film sandwich remains on the seating apparatus for less than about 10% of the time to complete dye transfer from the matrix film to the receiver film.

8. The method of claim 1, wherein the step of completing dye transfer comprises the steps of:

providing a transfer cabinet comprising a plurality of rollers having a predetermined relationship to one another, the plurality of rollers having predetermined diameters, thereby defining a substantially rectilinear film path; and directing the two-film sandwich along the film path.

9. The method of claim 8, wherein the step of directing the two-film sandwich along the film path comprises directing the two-film sandwich around a portion of and between each of the rollers in a predetermined sequence.

10. The method of claim 8, wherein the two-film sandwich is maintained in precise registration during the step of completing dye transfer by adjusting a tension of the films as they travel along the film path.

11. The method of claim 10, wherein the tension of the films is adjusted by adjusting the predetermined relationship of the plurality of rollers.

12. The method of claim 1, wherein the step of completing dye transfer comprises heating the two-film sandwich to a temperature of about 112 degrees Fahrenheit.

13. The method of claim 1, wherein the step of completing dye transfer comprises subjecting the two-film sandwich to a relative humidity of between about 45% and about 50%.

14. The method of claim 1, wherein the step of completing dye transfer takes between about 45 and about 50 seconds.

* * * * *